US009954952B2

(12) United States Patent
Duan et al.

(10) Patent No.: US 9,954,952 B2
(45) Date of Patent: Apr. 24, 2018

(54) DATA TRANSMISSION FOR AN INTERNET OF VEHICLES SYSTEM

(71) Applicant: International Business Machines Corporation, Armonk, NY (US)

(72) Inventors: Ning Duan, Beijing (CN); Guo Q. Hu, Shanghai (CN); Peng Ji, Nanjing (CN); Jun Zhu, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/526,951

(22) Filed: Oct. 29, 2014

(65) Prior Publication Data
US 2015/0120087 A1    Apr. 30, 2015

(30) Foreign Application Priority Data
Oct. 31, 2013   (CN) .......................... 2013 1 0530454

(51) Int. Cl.
*H04L 29/08*    (2006.01)
*H04W 4/02*    (2018.01)
*H04W 4/04*    (2009.01)
*H04L 29/06*    (2006.01)

(52) U.S. Cl.
CPC ............. *H04L 67/12* (2013.01); *H04W 4/028* (2013.01); *H04W 4/04* (2013.01); *H04L 67/125* (2013.01); *H04L 67/322* (2013.01); *H04L 69/04* (2013.01)

(58) Field of Classification Search
CPC ............................... H04L 67/12; H04W 4/028
See application file for complete search history.

(56) References Cited

U.S. PATENT DOCUMENTS

| 6,898,432 B1 | 5/2005 | Jiang |
| 6,925,378 B2 | 8/2005 | Tzamaloukas |
| 8,706,131 B2 | 4/2014 | Winters |

(Continued)

FOREIGN PATENT DOCUMENTS

| CN | 103189757 A | 7/2013 |
| DE | 102011118706 A1 | 5/2013 |
| WO | 2013028311 A1 | 2/2013 |

OTHER PUBLICATIONS

Foreign Patent Application No. 201310530454.5 entitled "Data Transmission Method and Apparatus for Internet of Vehicles", filed Oct. 31, 2013.

*Primary Examiner* — Jess Whittington
(74) *Attorney, Agent, or Firm* — Brian M. Restauro

(57) ABSTRACT

The present invention discloses a data transmission method and apparatus. The method comprises: obtaining information of a vehicle, the information comprising a current location of the vehicle; predicting a possible location of the vehicle in a future period of time and corresponding communication connection quality; predicting changes of the communication connection quality in the vehicle running course according to the communication connection quality at the current location of the vehicle and the communication connection quality at the predicted location; and according to the changes, determining an adjustment policy of computing resources for processing data uploaded by the vehicle. By means of the method and apparatus of the embodiments of the present invention, computing resources for processing real-time data uploaded by vehicles can be determined dynamically.

19 Claims, 3 Drawing Sheets

(56) References Cited

U.S. PATENT DOCUMENTS

| | | |
|---|---|---|
| 9,277,370 B2 | 3/2016 | Addepalli et al. |
| 9,451,447 B2 | 9/2016 | Tibbitts et al. |
| 2008/0097688 A1* | 4/2008 | Tashev ............ G01C 21/34 701/532 |
| 2009/0203388 A1 | 8/2009 | Karaoguz |
| 2013/0035083 A1* | 2/2013 | Kadel ............ H04W 84/005 455/418 |
| 2013/0053054 A1* | 2/2013 | Lovitt ............ H04W 48/20 455/456.1 |
| 2013/0151469 A1* | 6/2013 | Baker ............ G06F 17/30575 707/621 |
| 2013/0151693 A1* | 6/2013 | Baker ............ H04L 67/18 709/224 |
| 2014/0254543 A1* | 9/2014 | Engelhard ........ H04W 64/006 370/329 |

* cited by examiner

DATA TRANSMISSION FOR AN INTERNET OF VEHICLES SYSTEM

CROSS REFERENCE TO RELATED APPLICATION

Pursuant to 35 U.S.C. § 119, the present application claims priority to Chinese Application No. 2013-10530454.5, filed Oct. 31, 2013, the entire contents of which are incorporated herein by reference.

TECHNICAL FIELD

The present invention relates to data transmission, and more specifically, to a data transmission method and apparatus for an Internet of Vehicles (IOV) system.

BACKGROUND

In scenarios related to Internet of Vehicles systems, a vehicle periodically sends real-time data to a server by a vehicle-mounted terminal device. However, since the vehicle often travels through areas with bad signal quality, such as areas where the signal quality gets worse due to congestion or tunnels, mountains and other areas where the signal quality is already bad, phenomena such as re-transmission and disorder occur in data sent by the vehicle-mounted terminal device.

In order to completely receive data from the vehicle-mounted terminal for subsequent processing, the server usually has to preserve fixed computing resources for each vehicle in the light of the worst signal quality, such as a fixed data buffer, fixed data compression mode, fixed data submitting frequency, etc. For example, regarding a fixed buffer setting, since some systems take the worst situation into consideration while setting buffers, fixed buffers need to be allocated for each vehicle as many as possible in order to cope with possible re-transmission or re-ordering. However, since the worst situation has a low probability of occurrence, the existing fixed resource allocation mode is inefficient and resource-consuming. In an IOV system with a large amount of online vehicles, such fixed resources will become larger, which means a great burden on the server.

SUMMARY

According to a first aspect of the present invention, there is provided a data transmission method for a Internet of Vehicles system, the method comprising: obtaining information of a vehicle, the information comprising a current location of the vehicle; predicting a possible location of the vehicle in a future period of time and corresponding communication connection quality; predicting changes of the communication connection quality in the vehicle running course according to the communication connection quality at the current location of the vehicle and the communication connection quality at the predicted location; and according to the changes, determining an adjustment policy of computing resources for processing data uploaded by the vehicle.

According to a second aspect of the present invention, there is provided a data transmission apparatus for the Internet of Vehicles system, the apparatus comprising: an obtaining module configured to obtain information of a vehicle, the information comprising a current location of the vehicle; a predicting module configured to predict a possible location of the vehicle in a future period of time and corresponding communication connection quality; a communication connection quality predicting module configured to predict changes of the communication connection quality in the vehicle running course according to the communication connection quality at the current location of the vehicle and the communication connection quality at the predicted location; and an adjustment policy determining module configured to, according to the changes, determine an adjustment policy of computing resources for processing data uploaded by the vehicle.

BRIEF DESCRIPTION OF THE SEVERAL VIEWS OF THE DRAWINGS

Through description of some embodiments of the present disclosure and the accompanying drawings, certain features and advantages of the present disclosure will become more apparent. As used herein, the same reference generally refers to the same components in the embodiments of the present disclosure that are shown and described herein.

DETAILED DESCRIPTION

Figure 1:
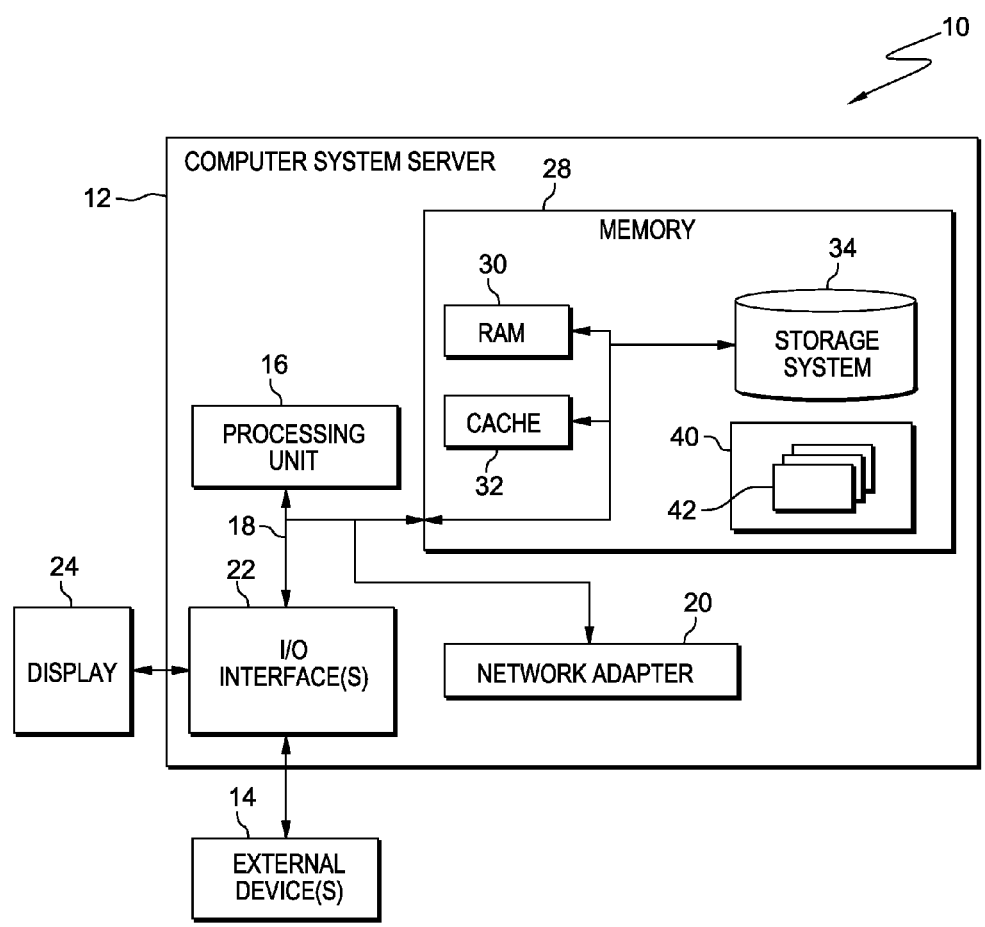
FIG. 1 illustrates a functional block diagram of an exemplary computer system/server, which is capable of implementing an embodiment of the present invention.

Some embodiments will be described in more detail with reference to the accompanying drawings, in which certain embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may be any computer readable medium that is not a computer readable storage medium and that can communicate, propagate, or transport a program for use by or in connection with an instruction execution system, apparatus, or device. The computer readable storage medium can be a tangible device that can retain and store instructions for use by an instruction execution device. A computer readable storage medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 illustrates a functional block diagram, 10, of an exemplary computer system/server 12, which is applicable to implement an embodiment of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
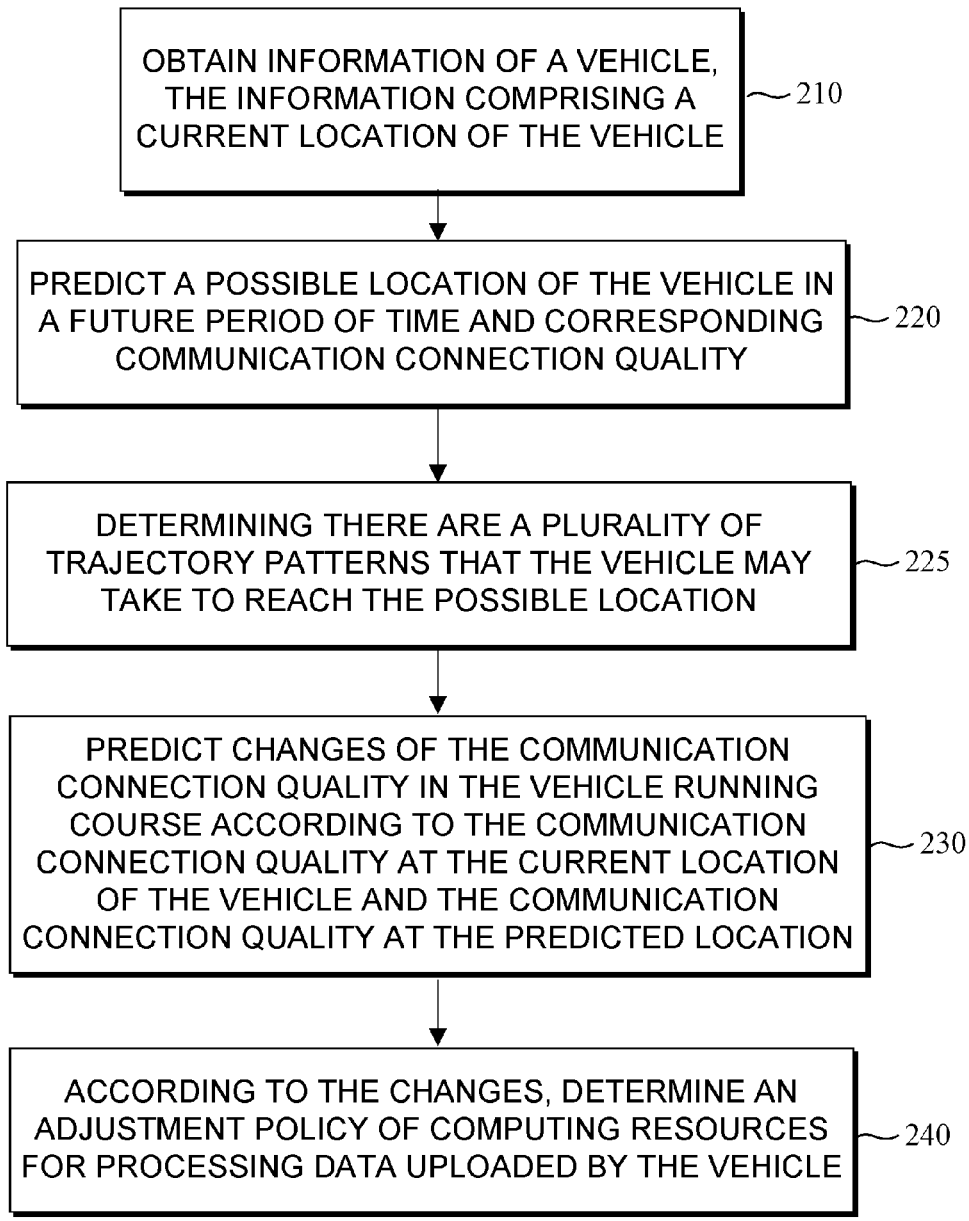
FIG. 2 shows a flowchart of a data transmission method for an Internet of Vehicles system, according to one embodiment of the present invention.

Now with reference to FIG. 2, this figure shows a flowchart of a data transmission method used in an Internet of Vehicles system according to one embodiment of the present invention. As shown in FIG. 2, the method comprises at least the following steps:

In step 210, information of a vehicle is obtained, which comprises a current location of the vehicle.

In this step, the obtained vehicle information comprises at least current location information of the vehicle. Typically, the current location of the vehicle can be determined in real time according to GPS data periodically uploaded by the vehicle.

In addition, other information uploaded by the vehicle, in one embodiment, is also be obtained, such as the vehicle's self-information. One example of the vehicle's self-information is fuel charge, tire pressure and other information reported through controller area network (CAN) data. Another example of the vehicle's self-information is the vehicle's profile information, such as a vehicle-mounted terminal's brand, sending/receiving device's sensitivity, sending/receiving power, etc. Of course, those skilled in the art may further obtain other information according to concrete demands, which is not detailed here.

In one embodiment, step 210 is implemented by a server, and the obtained information may come from a vehicle-mounted terminal on the vehicle.

In step 220, a possible location of the vehicle in a future period of time and corresponding communication connection quality are predicted.

In one embodiment, a road section which the vehicle might travel through in a future period of time may be predicted, such as a road section which the vehicle might travel through in next N minutes. Specifically, the road section which the vehicle might travel through may be predicted through vehicle trajectory data, trajectory pattern, road network information and other real-time data.

The road network information comprises a map, road network conditions, real-time road conditions, etc., and real-time road conditions may be determined from the vehicle trajectory data or by any existing means. In one embodiment, a concrete road section, which the vehicle is currently located in or will travel through, is determined according to a mapping relationship between GPS data and road sections in road network information.

In step 225, a plurality of trajectory patterns that the vehicle may take to reach the possible location is determined. The vehicle trajectory pattern is usually a statistical result of trajectories of a specific vehicle or similar vehicles, and, in some embodiments, is used for assisting prediction. As an example, the vehicle trajectory pattern, in one embodiment, is a trajectory of similar vehicles, or congestion law of a certain area.

Further, communication connection quality corresponding to locations possibly passed by is predicted. According to one embodiment of the present application, there is further comprised establishing a diagram of a distribution of the communication connection quality, the diagram of the distribution of the communication connection quality comprising communication connection quality information of multiple locations in a certain area; the predicting a possible location of the vehicle in a future period of time and corresponding communication connection quality comprises: according to the diagram of the distribution of the communication connection quality, determining communication connection quality of a possible location of the vehicle in a future period of time. In one embodiment, the establishing a diagram of a distribution of the communication connection quality comprises: receiving information of locations periodically uploaded by the vehicle and communication connection quality of the locations; and determining communication connection quality at each location according to massive information uploaded by the vehicle.

The communication connection quality is a comprehensive index, which, in one embodiment, is used for measuring the degree of stability of communication between the vehicle-mounted terminal and the server. In one embodiment, the signal connection quality is influenced by the packet loss rate, retransmission rate, response time and other factors. In the field of Internet of Vehicle systems, however, there further exist other factors prejudicing the communication connection quality. Therefore, in some embodiments, many factors are considered in order to increase the accuracy when measuring the degree of stability of communication. Specifically, one or more of the following factors may be utilized: location factors, e.g. distance from a 3G base station; road network and relevant factors, for example, in airport taxi waiting areas, high rises and viaduct areas which are prone to congestion, even though a certain location has a high bandwidth, the signal connection quality decreases in the case of vehicle congestion; vehicle profile factors, for example, vehicle-mounted terminals of vehicles belonging to different brands have inconsistent performance, i.e. might have different transmit power or sensibility, so even at the same location the communication connection quality of different vehicles varies. Processes of determining communication connection quality according to concrete factors are known to one skilled in the art; as such implementation details are not detailed here.

Alternatively, the establishing a diagram of a distribution of a communication connection quality, in some embodiments, further comprises: measuring signal connection quality at each of the locations by an instrument.

In one embodiment, the predicting a possible location of the vehicle in a future period of time and corresponding communication connection quality comprises: filtering the distribution of the communication connection quality according to the vehicle information, so as to obtain a distribution of the communication connection quality that is specific to the vehicle; and then determining communication connection quality of the vehicle at a possible location in a future period of time according to the communication connection quality distribution that is specific to the vehicle. In one embodiment, the communication connection quality distribution may be filtered using status and information of other similar vehicles, so as to create, based, at least in part, on the similar vehicles' data, a diagram of a distribution of the communication connection quality conforming to a current vehicle profile.

In one embodiment, a small-scope map window is determined, the map window includes a potential path and communication connection quality on the potential path. In one embodiment, the small-scope communication connection quality distribution diagram covers signal connection quality on a path, which the vehicle might travel through at a future point in time, e.g., one minute.

Those skilled in the art will understand that the more precisely the vehicle's location is predicted, the more accurate an adjustment policy to be determined in a subsequent step is. However, a bad prediction precision does not affect the implementation of the present application, except that the adjustment efficiency is decreased. As for how to predict a vehicle location, there exist multiple existing technique for reference, which are not detailed herein.

In step 230, changes of communication connection quality in the vehicle travel course are predicted according to communication connection quality at the current location of the vehicle and communication connection quality at the predicted location.

In one embodiment, the server may further notify the vehicle-mounted terminal of concrete location information and time information where and when signal quality will decrease. For example, changes of communication connection quality in the vehicle travel course are predicted by comparing connection quality at the current location of the vehicle and connection quality at the predicted location. In some embodiments, changes of communication connection quality are measured by a concrete numeric, for example, it is known that communication connection quality will decrease by 50%.

In one embodiment, changes of communication connection quality are predicted according to the vehicle's possible path having the worst communication connection quality. For example, the vehicle might turn left to a tunnel having a bad communication connection quality or turn right to an ordinary section having a good communication connection quality; then, changes of communication connection quality are predicted according to the worst possible scenario, and an adjustment policy of computing resources is determined based on the prediction in a subsequent step.

In step 240, an adjustment policy of computing resources for processing data uploaded by the vehicle is determined according to the changes.

While determining an adjustment policy of computing resources, time complexity (CPU) and space complexity (occupied memory) are usually main adjustable computing resources. On the other hand, in some embodiments, time complexity and space complexity are embodied as different kinds of computing resources.

In one embodiment, the computing resources comprise a decompression parameter that is set for the vehicle, the adjustment policy comprising: in response to a prediction that the communication connection quality will decrease, the server adjusting the decompression parameter to support uploaded data with higher compression efficiency from the vehicle, and notifying the vehicle to use a corresponding compression parameter for compressing data with the higher compression efficiency; in response to a prediction that the communication connection quality will increase, the server adjusting the decompression parameter to support data with lower compression efficiency from the vehicle, and notifying the vehicle to use a corresponding compression parameter for compress data with the lower compression efficiency. In this embodiment, in one example, the compression parameter comprises a consecutive message compression setting, compression algorithm execution performance, compression ratio and a setting parameter that predicts compression, which will be described in detail in FIG. 3.

In one embodiment, the computing resources may comprise a data uploading frequency that is set for the vehicle, the adjustment policy comprising: in response to a prediction that the communication connection quality will decrease, notifying the vehicle to increase the data uploading frequency for uploading as much data as possible before the communication quality gets worse; in response to a prediction that the communication connection quality will increase, notifying the vehicle to maintain or decrease the data uploading frequency for reducing the possibility of data loss or retransmission. In another embodiment, the adjustment policy further comprises: notifying the vehicle to decrease the data uploading frequency in an area that the communication connection quality gets worse; and notifying the vehicle to increase the data uploading frequency in an area that the communication connection quality gets better.

In one embodiment, the computing resources comprise a buffer space that is set for the vehicle, the adjustment policy comprising: in response to a prediction that the communication connection quality will decrease, enlarging the buffer space and determining a duration; in response to a prediction that communication connection quality will increase, narrowing the buffer space and determining a duration. In a more concrete embodiment, the adjustment policy is implemented by a module comprised at the server end. A data memory request can be made according to the adjustment policy, which request may contain information such as size and type of a required memory, etc. Then, the server end allocates a corresponding buffer space according to the request and performs necessary initialization. Therefore, by means of the embodiment, a data buffer may be dynamically released and allocated according to a prediction result rather than in a traditionally fixed mode. Moreover, in some embodiments, as memory reservation is reduced as much as possible, more resources are provided for other computation. As a result, the server's overall computing efficiency is enhanced, and the data transmission efficiency is increased. In particular, advantages of the method are better exhibited in scenarios where communication quality changes dramatically.

In one embodiment, the various adjustment policies described above can be used in combination. For example, in a tunnel since a storage space of the vehicle-mounted terminal is not large, data has to be stored in the vehicle so that the server allocates more CPU for decompressing data. Once the vehicle travels out of the tunnel, data in the tunnel should be sent out as soon as possible, and then normal sending frequency is restored.

In one embodiment, there is further comprised: the server notifying the vehicle of the prediction result and the adjustment policy; the vehicle adjusting data sending according to the prediction result and the adjustment policy.

Figure 3:
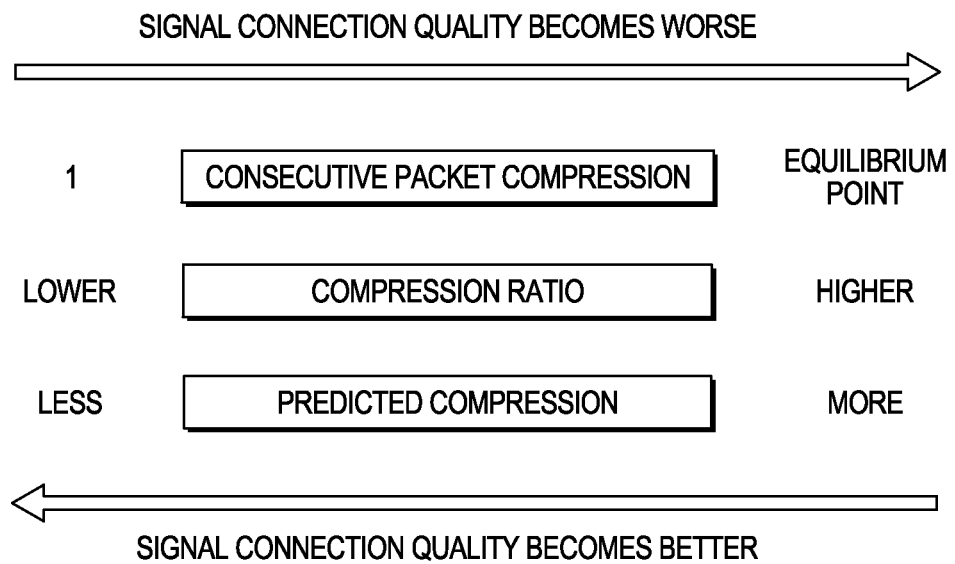
FIG. 3 shows a schematic view illustrating step 240 of FIG. 2, according to one embodiment of the present invention.

FIG. 3 is a schematic view illustrating step 240 in FIG. 2 by means of a more concrete embodiment, where various parameters related to a compression algorithm are involved, such as consecutive message compression number setting, compression ratio, a prediction parameter, etc. Detailed description is presented below to how to adjust the prediction parameter according to communication connection quality prediction when determining the adjustment policy.

In some embodiments, concerning the consecutive message compression number, when communication connection quality gets worse, a higher consecutive message compression number is set as far as possible; the compression ratio is increased and meanwhile the consecutive message decompression will also become complex, such that all messages need to be obtained for decompressing. In some embodiments, for single message compression, the relationship between messages does not need to be considered, whereas its compression ratio is lower than that of consecutive message compression. Therefore, the point of highest efficiency, when using the consecutive message compression, is found based, at least in part, on a concrete communication connection quality and a consecutive compression number equilibrium point.

In some embodiments, for the compression ratio parameter, the adjustment policy comprises: in response to a prediction that communication connection quality will decrease, the server adjusting the decompression ratio parameter to support uploaded data with higher compression efficiency, and notifying the vehicle to use a corresponding compression ratio parameter for compressing data with the higher compression efficiency; in response to a prediction that communication connection quality will increase, the server adjusting the decompression ratio parameter to support data with lower compression efficiency, and notifying the vehicle to use a corresponding compression ratio parameter for compressing data with the lower compression efficiency.

Likewise, for the prediction compression parameter, when communication connection quality decreases, more prediction compression is set as far as possible, and the compression ratio will increase. When communication connection quality increases, less prediction compression may be used.

Figure 4:
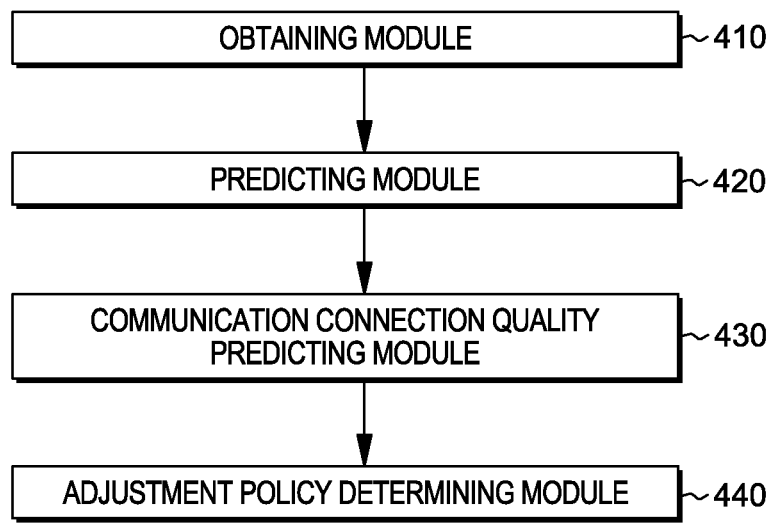
FIG. 4 shows a schematic view of a data transmission apparatus of the Internet of Vehicles system, according to one embodiment of the present invention.

FIG. 4 shows a schematic view of a data transmission apparatus according to one embodiment of the present invention, the apparatus comprising: an obtaining module 410 configured to obtain information of a vehicle, the information comprising a current location of the vehicle; a predicting module 420 configured to predict a possible location of the vehicle in a future period of time and corresponding communication connection quality; a communication connection quality predicting module 430 configured to predict changes of the communication connection quality in the vehicle running course according to the communication connection quality at the current location of the vehicle and the communication connection quality at the predicted location; and an adjustment policy determining module 440 configured to, according to the changes, determine an adjustment policy of computing resources for processing data uploaded by the vehicle.

In one embodiment, the computing resources comprise a buffer space that is set for the vehicle, the adjustment policy comprising: in response to a prediction that the communication connection quality will decrease, increasing the buffer space; in response to a prediction that the communication connection quality will increase, reducing the buffer space.

In one embodiment, the computing resources comprise a data uploading frequency that is set for the vehicle, the adjustment policy comprising: in response to a prediction that the communication connection quality will decrease, notifying the vehicle to increase the data uploading frequency for uploading as much data as possible before the communication quality gets worse; in response to a prediction that the communication connection quality will increase, notifying the vehicle to maintain or decrease the data uploading frequency.

In one embodiment, the computing resources comprise a decompression parameter that is set for the vehicle, the adjustment policy comprising: in response to a prediction that the communication connection quality will decrease, the server adjusting the decompression parameter to support uploaded data with higher compression efficiency from the vehicle, and notifying the vehicle to use a corresponding compression parameter for compressing data with the higher compression efficiency; in response to a prediction that the communication connection quality will increase, the server adjusting the decompression parameter to support data with lower compression efficiency from the vehicle, and notifying the vehicle to use a corresponding compression parameter for compressing data with the lower compression efficiency.

In one embodiment, the apparatus shown in FIG. 4 further comprises: a module configured to establish a diagram of a distribution of the communication connection quality, the diagram of the distribution of the communication connection quality comprising communication connection quality information at multiple locations in a certain area; the predicting module comprises: a module configured to determine communication connection quality at a possible location of the vehicle in a future period of time according to the diagram of the distribution of the communication connection quality.

In one embodiment, the predicting module comprises: a module configured to filter the distribution of the communication connection quality according to the vehicle information, so as to obtain a distribution of the communication connection quality that is specific to the vehicle.

In one embodiment, the module configured to establish a diagram of a distribution of the communication connection quality comprises: a module configured to receive information of locations periodically uploaded by the vehicle and communication connection quality at the locations; a module configured to determine communication connection quality at each location according to massive information uploaded by the vehicle.

Therefore, by means of the technical solutions according to the various embodiments of the present invention, it is possible to reasonably determine an adjustment policy of computing resources according to a prediction result, thereby not only satisfying computing resources' such demands as data retransmission, and disorder of emergencies, and rapid processing of data, but also increasing the efficiency of computing resources as far as possible.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data transmission method for an Internet of Vehicles system, the method comprising:
    obtaining information of a vehicle, the information comprising a current location of the vehicle, the vehicle including computing hardware that enables the vehicle to transmit and receive data wirelessly;
    predicting a possible location of the vehicle in a future period of time and corresponding communication connection quality;
    determining that there are a plurality of trajectory patterns that the vehicle may take to reach the possible location, based, at least in part, on one or more of: trajectory patterns of similar vehicles, congestion laws of the area the vehicle is in, road networks, GPS data, the current location of the vehicle, and the predicted possible location of the vehicle in a future period of time;
    predicting changes in the communication connection quality along the plurality of trajectory patterns, wherein predicted changes in the communication connection quality along the plurality of trajectory patterns that the vehicle may take are based, at least in part, on the communication connection quality at the current location of the vehicle and the communication connection quality at the predicted location, wherein the plurality of trajectory patterns includes the current location and the predicted location, and wherein communication connection quality i) is determined based, at least in part, on packet loss and ii) reflects a degree of stability of communication between the vehicle and a computing system;
    determining which one of the plurality of trajectory patterns has the lowest associated communication connection quality based, at least in part, on both measured and predicted changes in communication connection quality along the plurality of trajectory patterns;
    based, at least in part, on the changes that were predicted and the lowest associated communication connection quality for the determined one of the plurality of trajectory patterns, determining an adjustment policy of computing resources for processing data uploaded and downloaded by the vehicle; and
    implementing the adjustment policy such that a given degree of stability of communication is maintained between the vehicle and a given computing system that is in wireless communication with the vehicle.

2. The method according to claim 1, wherein the computing resources comprise a buffer space that is set for the vehicle, the adjustment policy comprising:
    in response to a prediction that the communication connection quality will decrease, increasing the buffer space; and
    in response to a prediction that the communication connection quality will increase, reducing the buffer space.

3. The method according to claim 1, wherein the computing resources comprise a data uploading frequency that is set for the vehicle, the adjustment policy comprising:
    in response to a prediction that the communication connection quality will decrease, notifying the vehicle to increase the data uploading frequency for uploading as much data as possible before the communication quality gets worse; and
    in response to a prediction that the communication connection quality will increase, notifying the vehicle to maintain or decrease the data uploading frequency.

4. The method according to claim 1, wherein the computing resources comprise:
    a decompression parameter that is set for the vehicle, the adjustment policy comprising:
    in response to a prediction that the communication connection quality will decrease, the server adjusting the decompression parameter to support uploaded data with higher compression efficiency from the vehicle, and notifying the vehicle to use a corresponding compression parameter for compressing data with the higher compression efficiency; and
    in response to a prediction that the communication connection quality will increase, the server adjusting the decompression parameter to support data with lower compression efficiency from the vehicle, and notifying the vehicle to use a corresponding compression parameter for compressing data with the lower compression efficiency.

5. The method according to claim 1, further comprising:
    generating a diagram of a distribution of the communication connection quality, the diagram of the distribution of the communication connection quality comprising communication connection quality information at multiple locations in a certain area;
    wherein the predicting a possible location of the vehicle in a future period of time and corresponding communication connection quality comprises:
    determining communication connection quality at a possible location of the vehicle in a future period of time according to the diagram of the distribution of the communication connection quality.

6. The method according to claim 5, wherein the predicting a possible location of the vehicle in a future period of time and corresponding communication connection quality comprises:
    filtering the distribution of the communication connection quality according to the vehicle information, so as to obtain a distribution of the communication connection quality that is specific to the vehicle.

7. The method according to claim 5, wherein the establishing a diagram of a distribution of the communication connection quality comprises:
    receiving information of locations periodically uploaded by the vehicle and communication connection quality at the locations; and
    determining communication connection quality at each location according to information uploaded by the vehicle.

8. A data transmission apparatus for an Internet of Vehicles system, the apparatus comprising:
    one or more computer processors;
    one or more computer readable storage medium;
    program instructions stored on the computer readable storage medium for execution by at least one of the one or more processors, the program instructions being included in one or more modules, the one or more modules comprising:

an obtaining module configured to obtain information of a vehicle, the information comprising a current location of the vehicle, the vehicle including computing hardware that enables the vehicle to transmit and receive data wirelessly;

a predicting module configured to predict a possible location of the vehicle in a future period of time and corresponding communication connection quality;

a first determining module configured to determines a plurality of trajectory patterns that the vehicle may take to reach the possible location, based, at least in part, on one or more of: trajectory of similar vehicles, congestion laws of the area the vehicle is in, road networks, GPS data, the current location of the vehicle, and the predicted possible location of the vehicle in a future period of time;

a communication connection quality predicting module configured to predict changes in the communication connection quality along the plurality of trajectory patterns, wherein predicted changes in communication connection quality along the plurality of trajectory patterns that the vehicle may take are based, at least in part, on the communication connection quality at the current location of the vehicle and the communication connection quality at the predicted location, wherein the plurality of trajectory patterns includes the current location and the predicted location, and wherein communication connection quality i) is determined based, at least in part, on packet loss and ii) reflects a degree of stability of communication between the vehicle and a computing system;

a second determining module configured to determine which one of the plurality of trajectory patterns has the lowest associated communication connection quality based, at least in part, on both measured and predicted changes in communication connection quality along the plurality of trajectory patterns;

an adjustment policy determining module configured to, according to the changes and the lowest associated communication connection quality for the determined one of the plurality of trajectory patterns, determine an adjustment policy of computing resources for processing data uploaded and downloaded by the vehicle; and an implementing module configured to implement the adjustment policy such that a given degree of stability of communication is maintained between the vehicle and a given computing system that is in wireless communication with the vehicle.

9. The apparatus according to claim 8, wherein the computing resources comprise a buffer space that is set for the vehicle, the adjustment policy comprising:

in response to a prediction that the communication connection quality will decrease, increasing the buffer space; and in response to a prediction that the communication connection quality will increase, reducing the buffer space.

10. The apparatus according to claim 8, wherein the computing resources comprise a data uploading frequency that is set for the vehicle, the adjustment policy comprising:

in response to a prediction that the communication connection quality will decrease, notifying the vehicle to increase the data uploading frequency for uploading as much data as possible before the communication quality gets worse; and in response to a prediction that the communication connection quality will increase, notifying the vehicle to maintain or decrease the data uploading frequency.

11. The apparatus according to claim 8, wherein the computing resources comprise a decompression parameter that is set for the vehicle, the adjustment policy comprising:

in response to a prediction that the communication connection quality will decrease, the server adjusting the decompression parameter to support uploaded data with higher compression efficiency from the vehicle, and notifying the vehicle to use a corresponding compression parameter for compressing data with the higher compression efficiency; and in response to a prediction that the communication connection quality will increase, the server adjusting the decompression parameter to support data with lower compression efficiency from the vehicle, and notifying the vehicle to use a corresponding compression parameter for compressing data with the lower compression efficiency.

12. The apparatus according to claim 8, further comprising:

a module configured to establish a diagram of a distribution of the communication connection quality, the diagram of the distribution of the communication connection quality comprising communication connection quality information at multiple locations in a certain area; and the predicting module comprising a module configured to determine communication connection quality at a possible location of the vehicle in a future period of time according to the diagram of the distribution of the communication connection quality.

13. The apparatus according to claim 12, the predicting module comprising:

a module configured to filter the distribution of the communication connection quality according to the vehicle information, so as to obtain a distribution of the communication connection quality that is specific to the vehicle.

14. The apparatus according to claim 12, wherein the module configured to establish a diagram of a distribution of the communication connection quality comprises:

a module configured to receive information of locations periodically uploaded by the vehicle and communication connection quality at the locations; and a module configured to determine communication connection quality at each location according to information uploaded by the vehicle.

15. The method of claim 1, further comprising:

predicting a possible location of the vehicle in a future period of time and corresponding communication connection quality by:

obtaining a distribution of the communication connection quality that is specific to the vehicle by filtering a distribution of the communication connection quality according to communication information specific to the vehicle; and determining communication connection quality of the vehicle at the possible location in the future period of time based, at least in part, on the communication connection quality distribution that is specific to the vehicle.

16. The method according to claim 1, wherein the distribution of the communication connection quality is filtered using status and information communication connection quality of other vehicles that have one or more characteristics in common with the vehicle of the type.

17. The method according to claim 5, further comprising:
generating the diagram of the distribution of the communication connection quality based, at least in part, on i) information regarding locations, which is periodically uploaded by the vehicle, and ii) respective communication connection qualities associated with those locations.

18. The method according to claim 1, wherein communication connection quality is further determined based on one or more of: data transmission ability of the vehicle, signal reception ability of the vehicle, distance from the vehicle to a network, a number of vehicles, signal reception ability of the vehicle, distance from the vehicle to a network, a number of vehicles connected to that network, retransmission rate of the network, and response time of the network.

19. A computer program product comprising:
one or more computer readable storage medium and program instructions stored on the computer readable storage medium, the program instructions comprising:
program instructions to obtain information of a vehicle, the information comprising a current location of the vehicle, the vehicle including computing hardware that enables the vehicle to transmit and receive data wirelessly;
program instructions to predict a possible location of the vehicle in a future period of time and corresponding communication connection quality;
program instructions to determine that there are a plurality of trajectory patterns that the vehicle may take to reach the possible location, based, at least in part, on one or more of: trajectory of similar vehicles, congestion laws of the area the vehicle is in, road networks, GPS data, the current location of the vehicle, and the predicted possible location of the vehicle in a future period of time;
program instructions to predict changes in the communication connection quality along the plurality of trajectory patterns, wherein program instructions to predict changes in the communication connection quality along the plurality of trajectory patterns that the vehicle may take are based, at least in part, on the communication connection quality at the current location of the vehicle and the communication connection quality at the predicted location, wherein the plurality of trajectory pattern includes the current location and the predicted location, and wherein communication connection quality i) is determined based, at least in part, on packet loss and ii) reflects a degree of stability of communication between the vehicle and a computing system;
program instructions to determine which one of the plurality of trajectory patterns has the lowest associated communication connection quality based, at least in part, on both measured and predicted changes in communication connection quality along the plurality of trajectory patterns;
based, at least in part, on the changes that were predicted and the lowest associated communication connection quality for the determined one of the plurality of trajectory patterns, program instructions to determine an adjustment policy of computing resources for processing data uploaded and downloaded by the vehicle; and
program instructions to implement the adjustment policy such that a given degree of stability of communication is maintained between the vehicle and a given computing system that is in wireless communication with the vehicle.

* * * * *